(12) United States Patent
Kobayashi (10) Patent No.: US 10,781,761 B2
(45) Date of Patent: Sep. 22, 2020

(54) CONTROL SYSTEM FOR INTERNAL COMBUSTION ENGINE

(71) Applicant: TOYOTA JIDOSHA KABUSHIKI KAISHA, Aichi-ken (JP)

(72) Inventor: Junya Kobayashi, Susono (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 16/679,314

(22) Filed: Nov. 11, 2019

(65) Prior Publication Data

US 2020/0191074 A1 Jun. 18, 2020

(30) Foreign Application Priority Data

Dec. 18, 2018 (JP) ................ 2018-236771

(51) Int. Cl.
| | |
|---|---|
| F02M 26/50 | (2016.01) |
| F02M 26/74 | (2016.01) |
| F02D 41/00 | (2006.01) |
| F02D 45/00 | (2006.01) |
| B60W 20/20 | (2016.01) |
| F02D 43/04 | (2006.01) |
| B60W 20/15 | (2016.01) |
| B60W 20/40 | (2016.01) |
| F02D 41/14 | (2006.01) |

(52) U.S. Cl.
CPC ......... *F02D 41/0055* (2013.01); *B60W 20/15* (2016.01); *B60W 20/20* (2013.01); *B60W 20/40* (2013.01); *F02D 43/04* (2013.01); *F02D 45/00* (2013.01); *F02M 26/50* (2016.02); *F02M 26/74* (2016.02); *F02D 2041/1472* (2013.01)

(58) Field of Classification Search
CPC ... B60W 20/15; B60W 20/40; F02D 41/0055; F02D 2041/1472; F02M 26/00; F02M 26/18; F02M 26/33; F02M 26/40; F02M 26/50; F02M 26/74; F02M 29/00; F02M 2026/001; F02N 11/0803
USPC ............... 123/179.4, 568.11, 568.12, 568.16
See application file for complete search history.

(56) References Cited

U.S. PATENT DOCUMENTS

| | | | |
|---|---|---|---|
| 2009/0308071 A1* | 12/2009 | Yamashita | .......... F02D 41/0065 60/602 |
| 2014/0100074 A1* | 4/2014 | Glugla | ............... B60W 10/184 477/3 |
| 2016/0146163 A1 | 5/2016 | Takada et al. | |
| 2016/0265458 A1* | 9/2016 | Okada | .................... F02M 26/50 |

(Continued)

FOREIGN PATENT DOCUMENTS

| | | | | |
|---|---|---|---|---|
| GB | 2540834 A | * | 2/2017 | ............ B60W 20/15 |
| JP | H10-280163 A | | 10/1998 | |
| JP | 2001-140670 A | | 5/2001 | |

(Continued)

*Primary Examiner* — Erick R Solis
(74) *Attorney, Agent, or Firm* — Hauptman Ham, LLP (57) ABSTRACT

Corrosion control is periodically executed to corrode the entire surface of the engine part in contact with the condensate water. The corrosion control includes a set of an anterior half control and a posterior half control. The anterior half control is executed over a first period from time t2 to time t3. In the anterior half control, the engine 12 is operated in a predetermined operating region. The posterior half control is executed over a second period from time t3 to time t4.

3 Claims, 10 Drawing Sheets (56) References Cited

U.S. PATENT DOCUMENTS

2016/0348598 A1\* 12/2016 Dixon .................. F02D 41/042
2017/0145933 A1\* 5/2017 Dudar .................. B60W 20/15

FOREIGN PATENT DOCUMENTS

| JP | 2010-121574 A | 6/2010 |
| JP | 2010-280947 A | 12/2010 |
| JP | 2012-246901 A | 12/2012 |
| WO | 2014/207916 A1 | 12/2014 |

\* cited by examiner

CONTROL SYSTEM FOR INTERNAL COMBUSTION ENGINE

CROSS-REFERENCE TO RELATED APPLICATION

The present application claims priority under 35 U.S.C. § 119 to Japanese Patent Application No. 2018-236771, filed Dec. 18, 2018. The contents of this application are incorporated herein by reference in their entirety.

BACKGROUND

The present disclosure relates to a control system for internal combustion engine (hereinafter also referred to simply as an "engine").

JP2010-121574A discloses a control system for the engine comprising an EGR (Exhaust Gas Recirculation) device. In this conventional system, when a predetermined stop condition is satisfied, the automatic stop control of the engine is executed in principle. In the conventional system, however, the execution of the automatic stop control is prohibited if temperature of a wall surface of an EGR channel is less than a predetermined temperature. In short, even if the stop condition is satisfied, the engine is operated and the automatic stop control is continued to execute until the temperature condition is satisfied.

When the temperature of the wall surface is low, water vapor contained in the EGR gas is condensed to condensate water. And if acid component contained in the EGR gas dissolves in the condensate water, the condensate water causes a corrosion of a metallic engine part. If the stop condition is established immediately after the start of the engine, the temperature of the wall surface is lower and condensate water is likely to occur. In this regard, the conventional system is able to execute the automatic stop control after the temperatures of the wall surface have been increased. Therefore, it is possible to suppress generation of the condensate water.

JP2012-246901A discloses a technical problem in which pitting corrosion occurs in stainless steel when chloride ion is included in the condensate water. The corrosion and the pitting corrosion are distinguished in that the former occurs throughout the engine part, whereas the latter occurs locally.

Due to a growing for emission requirement to a diesel engine and fuel economy requirements to a gasoline engine, usage frequency of the EGR gas tends to increase. The increase in the usage frequency means that a thermal range in which the EGR gas is introduced into the engine is enlarged and the introduced amount of the EGR gas is increased. In short, the increase in the usage frequency means that generation frequency of the corrosion also is increased. Therefore, there are limitations on solution approaches to suppress the generation of the condensate water.

If the engine part has a high corrosion-resistance, it is possible to suppress the generation of the corrosion to some extent. For example, if base material of the engine part is surface-treated or a surface of the base material is covered with a corrosion-resistant material, the corrosion-resistance may be increased. However, once the pitting corrosion occurs in a surface layer with a corrosion-resistance, the following problems arise. That is, when the chloride ion flows into inside of a surface layer afterward the generation of the pitting corrosion, discharge of the chloride ion to outside is hindered by the surface layer. Then, the corrosion of the base material by the chloride ion is accelerated and the pitting corrosion enlarges its size.

It is an object of the present disclosure to provide a technique capable of suppressing an expansion of the pitting corrosion in a metallic engine part in the engine including the EGR device.

SUMMARY

A first aspect is a control system for internal combustion engine.

The control system includes an internal combustion engine, a generator, an EGR pipe, a metallic engine part, and a controller.

The internal combustion engine is mounted on a vehicle.

The generator is configured to generate electric power by using power from the internal combustion engine.

The EGR pipe connects an exhaust pipe and an intake pipe of the internal combustion engine.

The engine part is provided on an EGR gas channel through which an EGR gas flows to the internal combustion engine via the EGR pipe. The engine part includes a surface layer having a corrosion-resistance on its surface to which the EGR gas contacts.

The controller is configured to control an operation of the internal combustion engine and the generator.

The controller is further configured to:
determine whether or not a repeating period which was set in accordance with the engine part has elapsed;
when it is determined that the repeating period has elapsed, determine whether or not there has been an operation request to the internal combustion engine intended to drive the vehicle or generate the electric power with the generator;
when it is determined that there has been no operation request, execute corrosion control in which the internal combustion engine is operated over a first period in a predetermined operating region in which condensate water occurs and then the operation of the internal combustion engine is stopped over a second period; and
during the execution of the corrosion control, control the operation of the generator such that the generator generates the electric power by using the power from the internal combustion engine.

The second aspect further has the following feature in the first aspect.

The controller is further configured to:
during the execution of the corrosion control, repeatedly determine whether or not there has been the operation request; and
when it is determined that there has been the operation request during the execution of the corrosion control, stop the execution of the corrosion control.

The third aspect further has the following features in the first aspect.

The control system further comprises a battery.

The battery is configured to charge the electric power generated by the generator.

According to the first aspect, the corrosion control is executed. The corrosion control is executed in which the internal combustion engine is operated over the first period in the predetermined operating region in which the condensate water occurs and then the operation of the internal combustion engine is stopped over the second period. Therefore, the condensate water is supplied to the surface layer during first period, and the condensate water evaporates during the second period. An acid component contained in the EGR gas is dissolved in the condensate water supplied into the first period. Thus, during the second period, acidity of the condensate water increases by which the surface layer is corroded. However, when a pitting corrosion has occurred in the surface layer, a part of the surface layer which prevents chloride ion from being discharged to the outside is also corroded during the second period. Then, it becomes easy for the chloride ion to run out from the pitting corrosion by using the condensate water generated after the second period. Therefore, it is possible to prevent the pitting from enlarging its size.

According to the second aspect, when the operation request is issued during the execution of the corrosion control, the same execution is stopped. Therefore, it is possible to respond to the operation request in priority to the execution of the corrosion control once the operation request is issued while executing the corrosion control reliably during the absence of the operation request.

According to the third aspect, the battery is charged with the electric power generated by the generator. Therefore, it is possible to compensate the electric power consumed by the execution of the corrosion control with the execution thereof.

DESCRIPTION OF EMBODIMENT

Hereinafter, an embodiment of the present disclosure will be described referring to the drawings. It should be noted that same signs are attached to the same elements in the respective drawings, and duplicate descriptions are omitted. In addition, the present disclosure is not limited to the following embodiment.

1. Configuration Example of Control System

Figure 1:
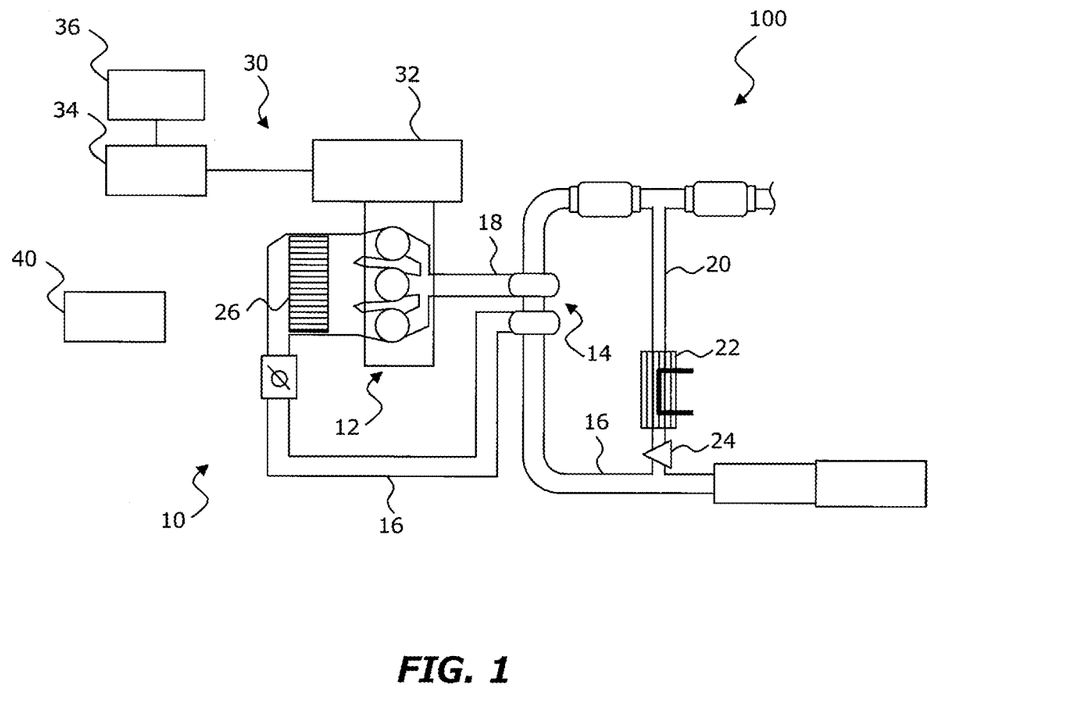
FIG. 1 is a diagram for showing a first configuration example of a control system according to an embodiment of the present disclosure.

A control system for internal combustion engine according to the embodiment is mounted on a vehicle. FIG. 1 is a diagram for showing a first configuration example of the control system according to the embodiment. A control system 100 shown in FIG. 1 is a hybrid system including an engine system 10 and a rotating electrical system 30.

1.1 Engine System

The engine system 10 includes an engine 12. The engine 12 is a diesel engine or a gasoline engine. The engine 12 is depicted as an in-line three-cylinder engine. However, number of the cylinders of the engine 12 and their arrangement of the engine 12 are not limited thereto.

The engine system 10 also includes a turbocharger 14. The turbocharger 14 supercharges intake air by using exhaust energy. A compressor of the turbocharger 14 is provided on an intake pipe 16. A turbine of the turbocharger 14 is provided on an exhaust pipe 18.

The engine system 10 also includes an EGR pipe 20. The EGR pipe 20 connects the intake pipe 16 and the exhaust pipe 18. The EGR pipe 20 recirculates an exhaust gas flowing downstream of the turbine to an upstream side of the compressor. A water-cooling type EGR cooler 22 is provided in a middle of the EGR pipe 20. An electronically controlled EGR valve 24 is provided downstream of the EGR cooler 22. Here, "downstream" of the EGR cooler 22 is defined with reference to a flow direction of the exhaust gas flowing through the EGR pipe 20.

When the EGR valve 24 is opened, a part of the exhaust gas flowing through the exhaust pipe 18 flows into the intake pipe 16 via the EGR pipe 20. The exhaust gas (i.e., the EGR gas) flowing into the intake pipe 16 is supercharged by the compressor. The exhaust gas supercharged by the compressor is cooled by an intercooler 26, and then it flows into the cylinders of the engine 12. In the present disclosure, a path from an exhaust inlet of the EGR pipe 20 to an exhaust inlet of the respective cylinders is defined as an "EGR gas channel through which the EGR gas flows into the engine 12 via the EGR pipe 20".

1.2 Rotating Electrical System

The rotating electrical system 30 includes a transaxle 32, a PCU (Power Control Unit) 34 and a battery 36. The transaxle 32 includes, for example, a first MG (Motor Generators) and a second MG for vehicle travel, a differential gear, and a driving force distribution mechanism. The PCU converts DC power of the battery 36 into AC power suitable for driving the first and second MGs. The driving force distribution mechanism appropriately combines an output torque of the engine 12 and that of the first and the second MGs, and outputs the combined torques. The combined torques are transmitted to wheels via the differential gear.

The driving force distribution mechanism may distribute the output torque of the engine 12 to the first MG and the wheels. In this case, the vehicle generates electric power at the first MG while traveling by the power from the engine 12. The driving force distribution mechanism may only provide the output torque of the engine 12 to the first MG. In this case, the vehicle uses the power from the engine 12 to generate the electric power at the first MG. The PCU converts alternating-current regenerative power generated by the first MG into the DC power. The regenerative power converted into the DC power is used to charge the battery 36.

1.3 Controller

The control system 100 includes an ECU (Electric Control Unit) 40 as the controller. The ECU 40 is, for example, a microcomputer including a CPU (Central Processing Unit), a memory, and input/output ports. The ECU 40 may be composed of a plurality of microcomputers.

The ECU 40 receives a state of the battery 36 detected by a power monitoring unit (not shown). The ECU 40 executes drive control of the first and second MGs based on the detected result. The ECU 40 receives detected values such as intake air amount, coolant temperature from various sensors mounted on the engine system 10. The ECU 40 calculates output command values and target engine speed of the engine 12 based on the detected result, and executes the drive control of the engine 12.

2. Characteristic Control Executed in Embodiment

As described above, the acidic condensate water corrodes the metallic engine part, in particular a component made of aluminium alloy or stainless-steel. Such the engine part may include the EGR pipe 20, the EGR cooler 22, the intercooler 26, and an intake air valve of the engine 12. Also, the acidic condensate water containing chloride ion causes a local corrosion of the engine part (i.e., the pitting corrosion).

2.1 Generation Mechanism of Pitting Corrosion

The chloride ion, for example, may enter a fuel tank during a vehicle shipping or may enter the fuel tank while the vehicle travels along a maritime area. While the vehicle travels along the maritime area, the chloride ion is also mixed into intake air. When the chloride ion is contained in fuel or intake air, the pitting corrosion is likely to occur.

Figure 2:
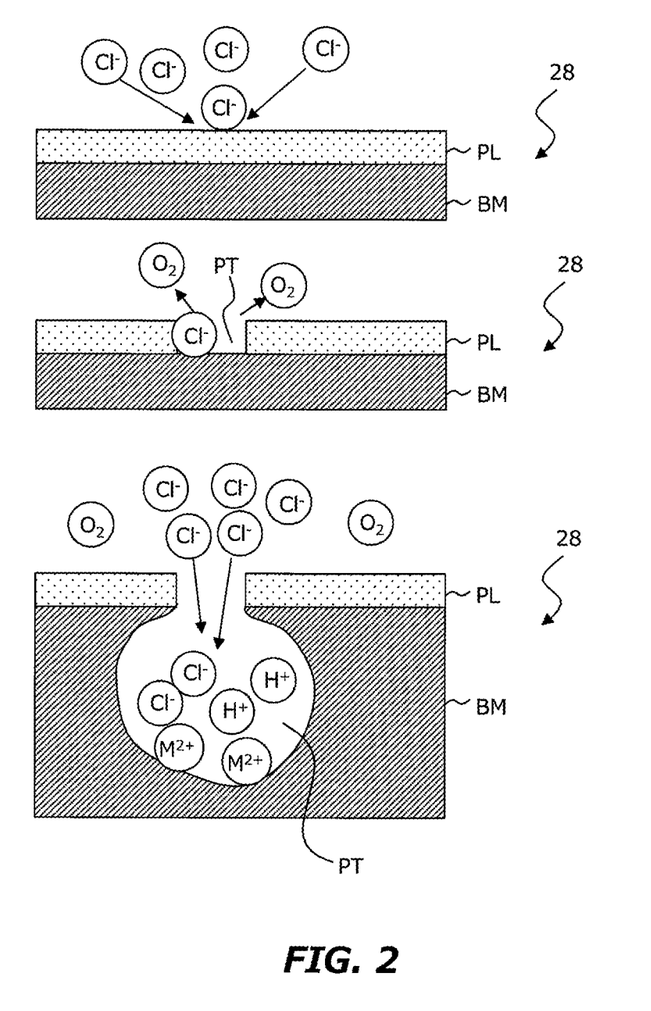
FIG. 2 is a diagram for explaining a generation mechanism of a pitting corrosion.

FIG. 2 is a diagram for explaining a generation mechanism of the pitting corrosion. Upper, middle, and lower parts of FIG. 2 represent cross-sections of an engine part 28 in time series. The engine part 28 is composed of a base material BM and a passive layer PL covering the base material BM. The passive layer PL is a metallic oxide film formed on a surface to which the EGR gas contacts. The passive layer PL is formed by oxidizing the surface of the base material BM. Oxidation of the surface may be formed by an oxidation treatment or an air oxidation.

As shown in the upper part of FIG. 2, the chloride ion (Cl⁻) contained in the condensate water adsorbs to the surface of the passive layer PL in presence of uneven electric potential distribution. The uneven electric potential distribution is formed due to a transition or an inclusion contained in the passive layer PL or the base material BM. As the chloride ion is adsorbed on the surface of the passive layer PL, its concentration at the adsorption site increases.

And, as shown in the middle part of FIG. 2, when the concentration of the chloride ion at the adsorption site increases, oxygen atoms contained in the passive layer PL receive electrons from the chloride ion and then ionize. As a result, the passive layer PL is locally destroyed. The substituted oxygen atoms are released as an oxygen molecule to an outside of the passive layer PL. When the local destruction progresses, the passive layer PL disappears and the pitting corrosion PT occurs.

And, as shown in the lower part of FIG. 2, when the chloride ion is adsorbed on the pitting corrosion PT, metallic atoms constituting the base material BM are ionized. Since corrosion-resistance of the base material BM is lower than that of the passive layer PL, the metallic atoms are ionized by the chloride ion. In addition, since hydrogen ion (H⁺) is generated by hydration reaction $(M^{2+}+2(H_2O) \rightarrow M(OH)_2+ 2H^+)$ of the metallic ion ($M^{2+}$), the metallic atom is also ionized by the hydrogen ion. As a result, the size of the pitting corrosion PT enlarges.

The problems here are that the chloride ion and hydrogen ion should be washed out by supplying fresh condensate water into the pitting corrosion PT. However, a healthy passive layer PL present on the pitting corrosion PT acts as a cover which inhibits the supply of the condensate water and the discharge of the ions. Therefore, once the pitting corrosion PT occurs in the passive layer PL, the pitting corrosion PT enlarges at an accelerated pace.

2.2 Corrosion Control

Figure 3:
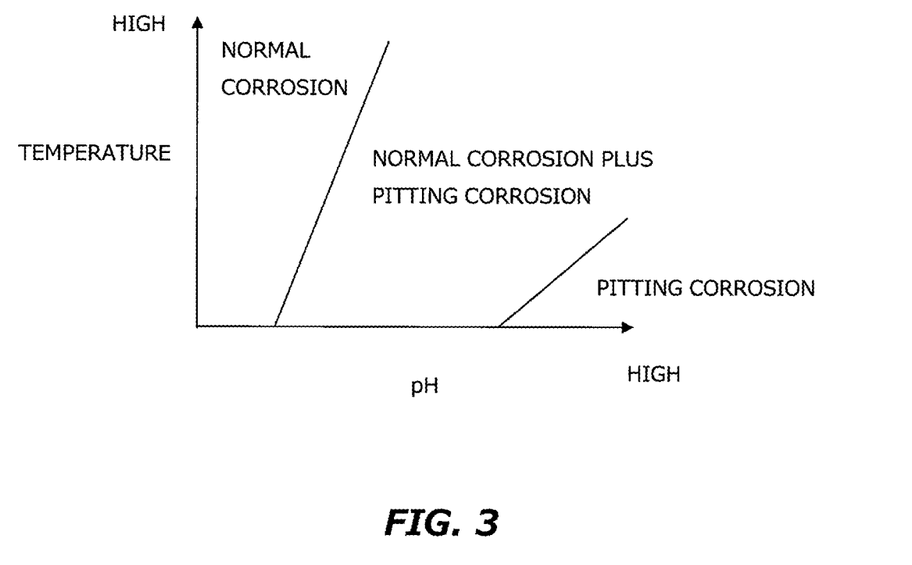
FIG. 3 is a graph for showing a relation between pH in acid solution containing chloride ion, temperature of the acid solution and a corrosion phenomenon of metals.

Therefore, in the embodiment, corrosion control in which entire surfaces of the engine part in contact with the condensate water are corroded is periodically executed. FIG. 3 is a graph for showing a relation between pH in acid solution containing the chloride ion, temperature of the acid solution and a corrosion phenomenon of metals. As shown in FIG. 3, in a high-pH region, the pitting corrosion is more likely to occur than a normal corrosion. In a low-pH region, the normal corrosion is more likely to occur than the pitting corrosion. In a high temperature region, even if pH is somewhat high, the normal corrosion easily occurs.

From the relation shown in FIG. 3, it is understood that when the pH of the condensate water is adjusted to the low-pH region, it is possible to corrode the entire surface of the engine part by contacting with the condensate water while preventing a new pitting corrosion on the surface from occurring. When the entire surface is corroded, it is possible to corrode the passive layer PL which functions as the cover.

Figure 4:
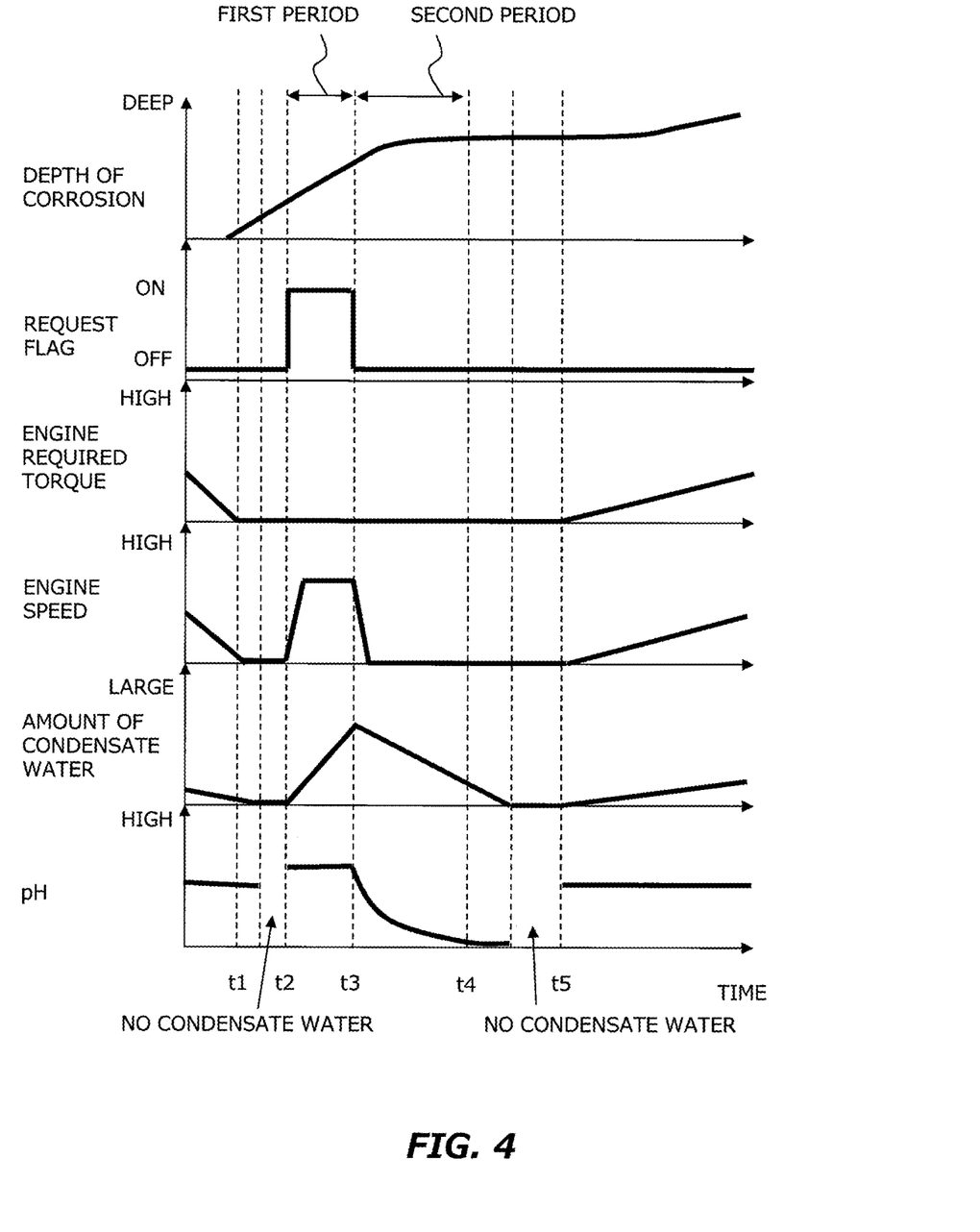
FIG. 4 is a time chart for explaining corrosion control.

The corrosion control includes a set of an anterior half control and a posterior half control. FIG. 4 is a time chart for explaining the corrosion control. In an example shown in FIG. 4, required torque to the engine 12 (engine required torque) progressively reduces and becomes zero at time t1. The required torque has been required for driving the vehicle or generating the electric power by the first MG. When the required torque drops to zero, the engine speed also drops to zero.

The anterior half control is executed over a first period from time t2 to time t3. In the anterior half control, the engine 12 is operated in a predetermined operating region. The predetermined operating region is an operating region in which a large amount of the condensate water occurs, and is specified in advance through experiments or the like. The first period is preset according to a target amount of the condensate water to be occurred. During the first period, a request flag is set to ON. This request flag is a flag for requesting the anterior half control to be executed.

The posterior half control is executed over a second period from the time t3 to time t4. That is, the execution of the posterior half control is started with completion of the execution of the anterior half control. In the posterior half control, the operation of the engine 12 is continuously stopped. The second period is preset to a period as long enough to the pH of the condensate water occurred in the first period drops to the low-pH region described in FIG. 3.

After an elapse of the second period, when the required torque to the engine 12 is issued at time t5, the condensate water is generated. The required torque has been required for driving the vehicle or generating the electric power by the first MG.

Figure 5:
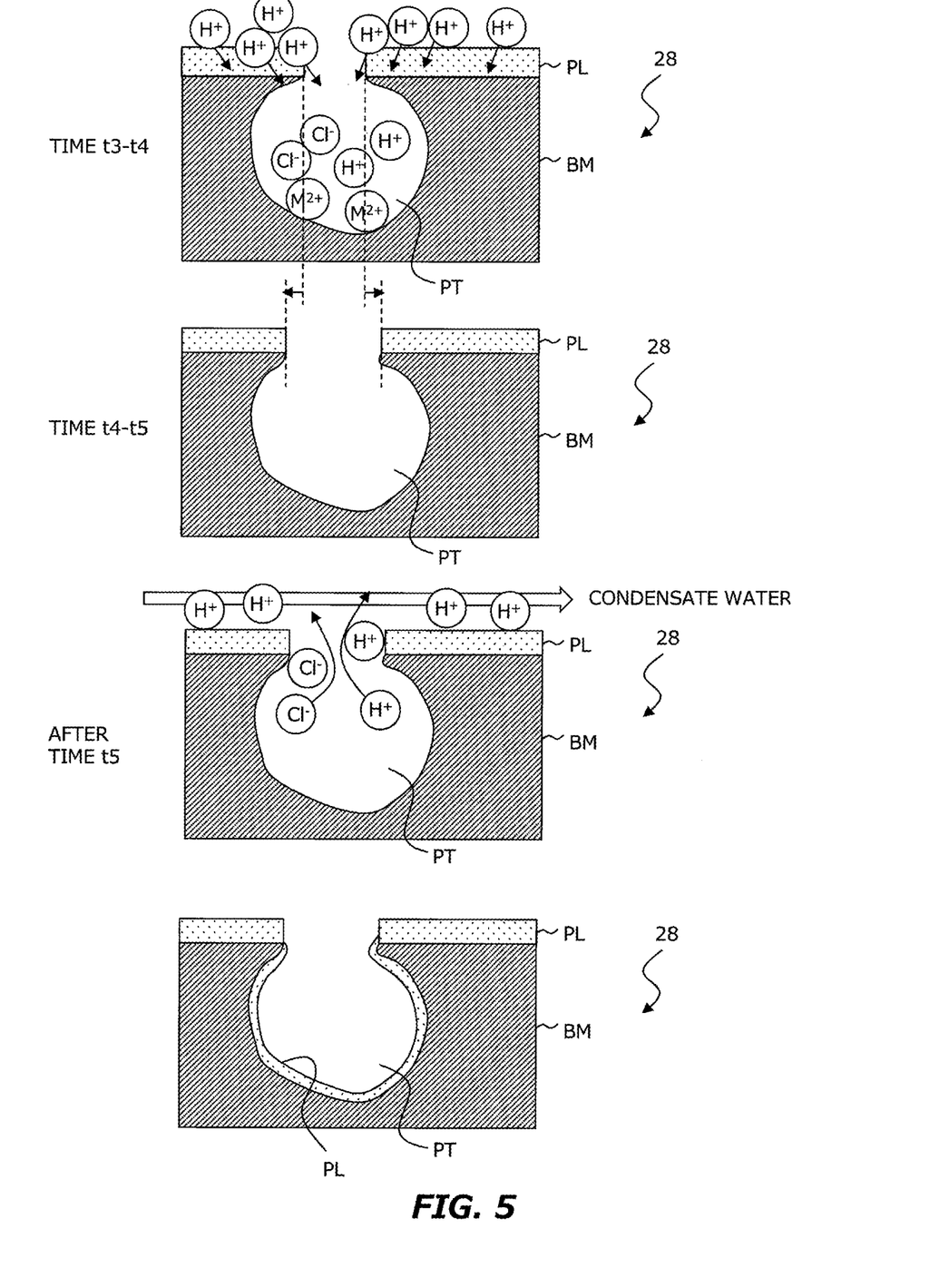
FIG. 5 is a diagram for explaining surrounding circumstances of the pitting corrosion after time t3 shown in FIG. 4.

FIG. 5 is a diagram for explaining surrounding circumstances of the pitting corrosion after the time t3. In the second period, since the condensate water gradually evaporates, the amount of the condensate water gradually decreases. Therefore, during the decrease of the condensate water, the concentration of the hydrogen ion in the condensate water in contact with the surface of the passive layer PL continues to increase. That is, the pH of the condensate water continues to drop. Then, at an end of the second period, the pH of the condensate water decreased to pH in the low-pH region described with reference to FIG. 3. Then, the passive layer PL existing on the pitting corrosion PT is corroded. As a result, an opening area of the pitting corrosion PT is enlarged.

When the opening area is enlarged, the chloride ion in the pitting corrosion PT and the hydrogen ion in and out of the pitting corrosion PT are easily washed out by the condensate water generated after the time t5. When the engine part 28 is made of stainless-steel, after the ions in the pitting corrosion PT are washed out and the condensate water in the pitting corrosion PT evaporates, a new passive layer PL can be formed by air oxidization of a constituent surface of the pitting corrosion PT.

Note that, in the example shown in FIG. 4, there is no engine required torque during the first or second period. Therefore, the opening area is enlarged during the second period. In other words, when there is the engine required torque during the first or second period, it is difficult to enlarge the opening area. Here, a response to the engine required torque should take precedence over executing the corrosion control. Therefore, in such the case, it is desirable to stop executing the corrosion control.

2.3 Charge Control

In the embodiment, the electric power is generated by the first MG with the power from the engine 12 during the execution of the anterior half control. As described above, the PCU converts the regenerative AC power generated by the first MG into DC power. The regenerative power converted into DC power is used to charge the battery 36. The anterior half control is executed by using the electric power from the battery 36. Therefore, if the electric power is generated by the first MG, a part of the electric power consumed during the execution of the anterior half control is compensated by the execution of the same control.

2.4 Specific Processing

Figure 6:
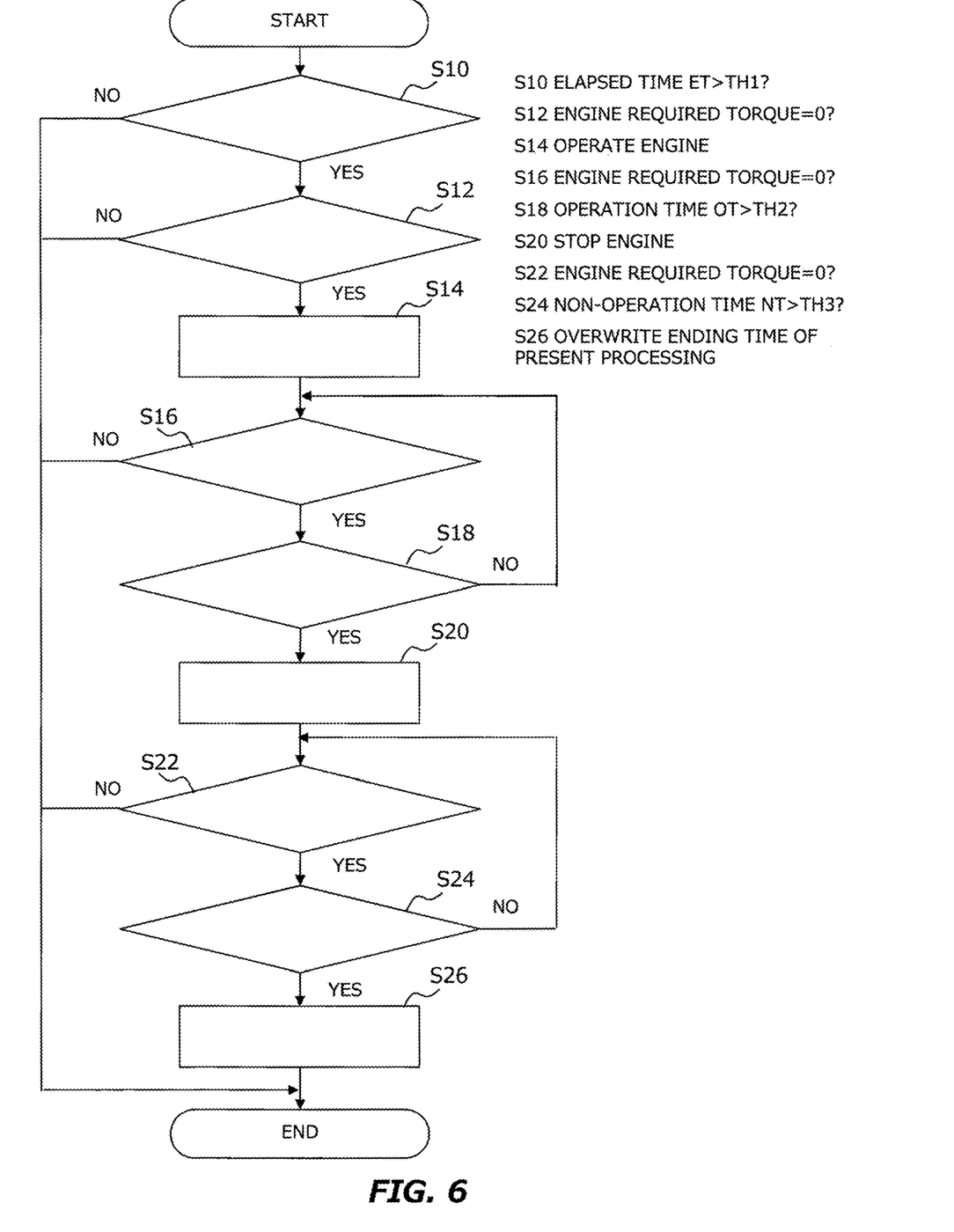
FIG. 6 is a flow chart for explaining processing flow of the corrosion control executed by an ECU.

FIG. 6 is a flow chart for explaining processing flow of the corrosion control executed by the ECU 40. The routine shown in FIG. 6 is repeatedly executed at a predetermined control cycle.

In the routine shown in FIG. 6, it is first determined whether or not an elapsed time ET is longer than a threshold TH1 (step S10). The elapsed time ET is measured in the ECU 40 from an end time of the execution of the last corrosion control. The threshold TH1 is set in advance in accordance with the corrosion-resistance of the engine part 28.

Figure 7:
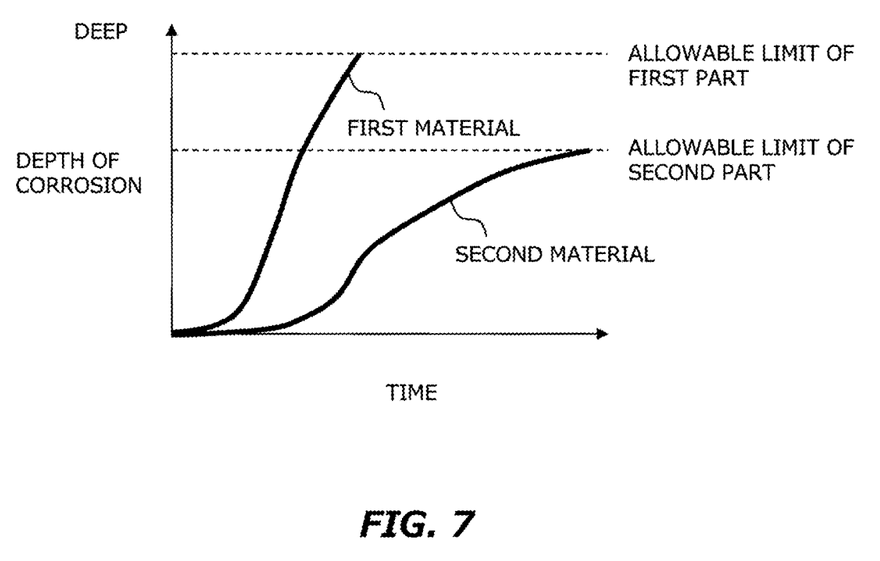
FIG. 7 is a diagram for explaining a method for setting a repeating period of the corrosion control.

FIG. 7 is a diagram for explaining a setting method of the threshold TH1 (i.e., a repeating period of the corrosion control). As shown in FIG. 7, a corrosion speed of a first component made of a first material differs from that of a second component made of a second material. In addition, an allowable limit which is determined according to a depth of the corrosion and a reliability of the material also differs between the first and second components. An occurrence frequency of the corrosion and the pitting corrosion, and the depth of the corrosion and the pitting corrosion can be measured for each engine part 28. The occurrence frequency of the condensate water can also be measured. The threshold TH1 is set in view of these.

If the judgement result of the step S10 is negative, the current processing is terminated. On the other hand, if the judgement result is positive, it is determined whether or not the engine required torque is zero or not (step S12). The engine required torque is required for driving the vehicle or generation of the electric power by the first MG.

If the judgement result in the step S12 is negative, the current processing is terminated. The reason for this is to prioritize responses to the engine required torque. On the other hand, if the judgement result is positive, the engine 12 is operated (step S14). An operating condition of the engine 12 is set to a condition in which a large amount of the condensate water is generated (e.g., engine speed, engine load and an opening degree of the EGR valve). When such processing is executed, the execution of the anterior half control is started.

Subsequent to the step S14, it is determined whether or not the engine required torque is zero (step S16). The processing of the step S16 is the same as that of the step S12.

If the judgement result of the step S16 is negative, the current processing is terminated. The reason for this is the same as that explained in the step S12. On the other hand, if the judgement result is positive, it is determined whether or not the operating time OT of the engine 12 is longer than a threshold TH2 (step S18). The threshold TH2 is a period corresponding to the first period described with reference to FIG. 4.

If the judgement result of the step S18 is negative, the processing of the step S16 is executed. On the other hand, if the judgement result is positive, the operation of the engine 12 is stopped (step S20). When the processing of the step S20 is executed, the execution of the anterior half control is terminated, and that of the posterior half control is started.

Subsequent to the step S20, it is determined whether or not the engine required torque is zero (step S22). The processing of the step S22 is the same as that of the step S12.

If the judgement result of the step S22 is negative, the current processing is terminated. The reason for this is the same as that explained in the step S12. On the other hand, if the judgement result is positive, it is determined whether or not a stop time NT of the engine 12 is longer than a threshold TH3. The threshold TH3 is a period corresponding to the second period described with reference to FIG. 4.

If the judgement result of the step S24 is negative, the processing of the step S22 is executed. On the other hand, if the judgement result is positive, the ending time of the present processing is overwritten (step S26). Then, the measurement of the elapsed time ET used for the processing of the step S10 is restarted from the ending time.

3. Advantageous Effects by Executing Characteristic Control

Figure 8:
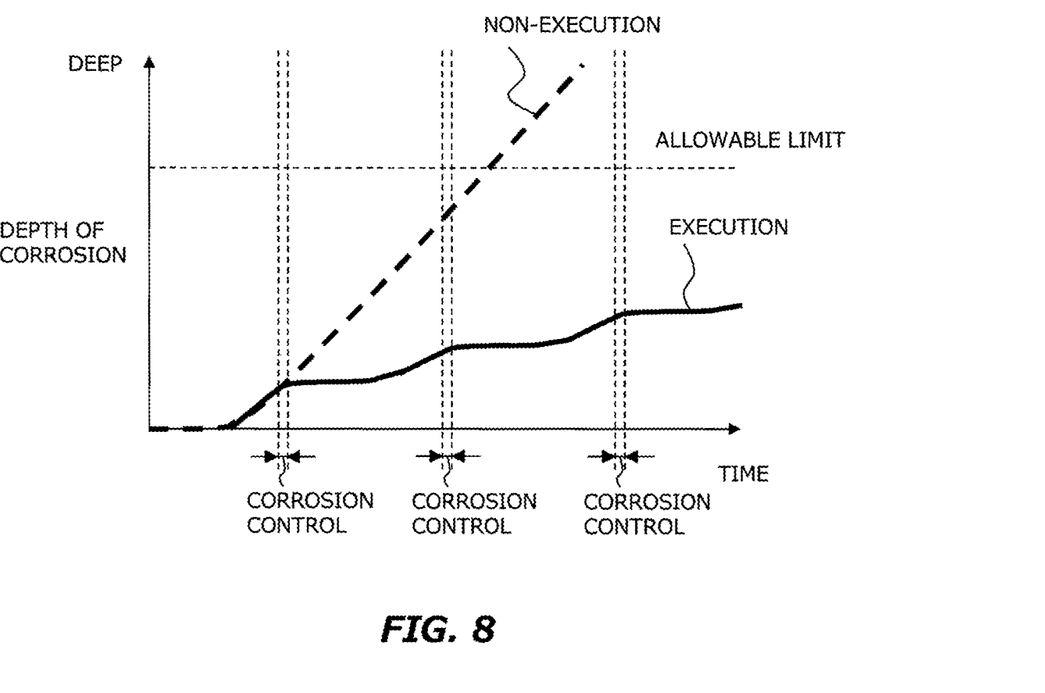
FIG. 8 is a diagram for explaining advantageous effects by the executing the corrosion control.

According to the execution of the corrosion control described above, it is possible to suppress the enlargement speed of the pitting corrosion PT. FIG. 8 is a diagram for explaining advantageous effects by executing the corrosion control. As shown in FIG. 8, when the corrosion control is not executed (i.e., non-execution), it becomes difficult to stop the enlargement of the pitting corrosion that has once occurred. Therefore, the pitting corrosion depth reaches the allowable limit in a short time. In this regard, if the corrosion control is executed periodically (i.e., execution), the enlargement speed of pitting corrosion can be slowed down. Therefore, it is possible to extend the life of the engine part.

According to the charge control, it is possible to compensate by the execution of the anterior half control for a part of the electric power consumed during the execution of the same control. Therefore, according to the execution of the characteristic control, it is possible to decrease the enlargement speed of the pitting corrosion while minimizing the electric power consumed for suppressing the same.

4. Other Configuration Examples of Control System

Figure 9:
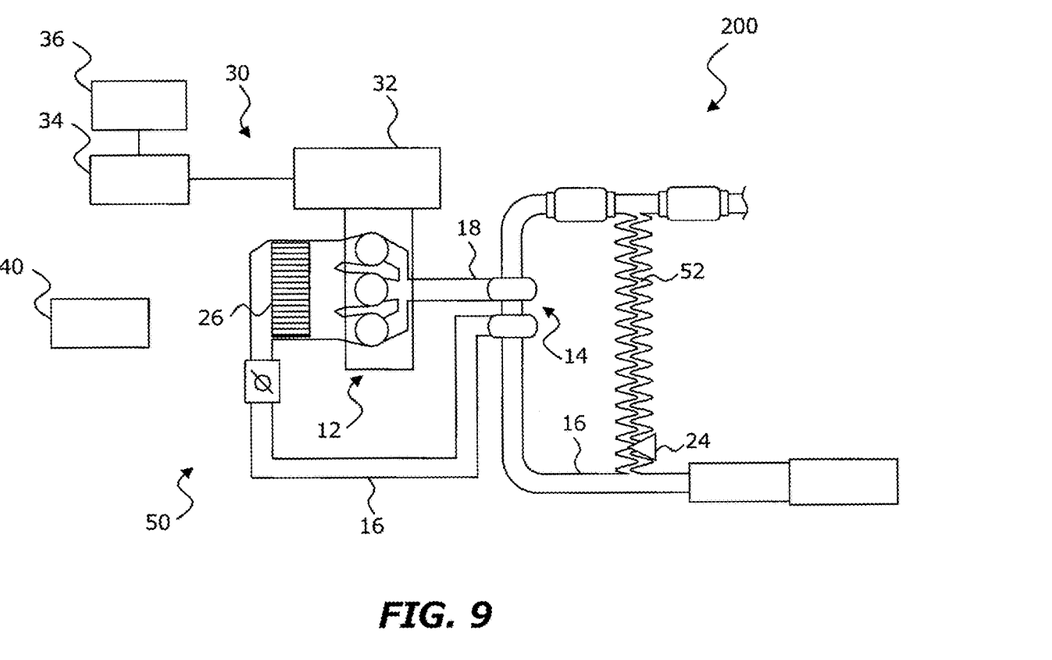
FIG. 9 is a diagram for showing a second configuration example of the control system according to the embodiment.

FIG. 9 is a diagram for showing a second configuration example of the control system according to the embodiment.

A control system 200 shown in FIG. 9 includes an engine system 50. Unlike the engine system 10 shown in FIG. 1, the engine system 50 includes a wave-shaped EGR pipe 52 whereas does not include the EGR cooler 22. According to the EGR pipe 52 having such a shape, it is possible to cool the exhaust gas to generate a large amount of the condensate water in the same manner as the EGR cooler 22.

Figure 10:
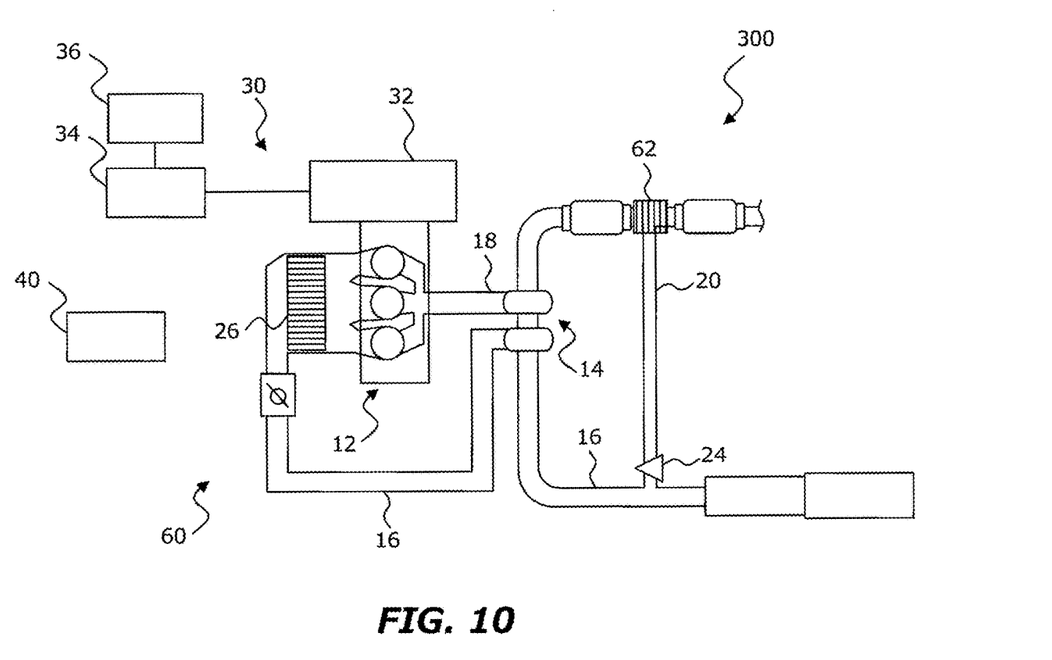
FIG. 10 is a diagram for showing a third configuration example of the control system according to the embodiment.

FIG. 10 is a diagram for showing a third configuration example of the control system according to the embodiment. The control system 300 shown in FIG. 10 includes an engine system 60. Unlike the engine system 10 shown in FIG. 1, the engine system 60 includes an exhaust heat recovery equipment 62 provided in the exhaust pipe 18. According to the exhaust heat recovery equipment 62, it is possible to cool the exhaust gas to generate a large amount of the condensate water in the same manner as the EGR cooler 22.

Figure 11:
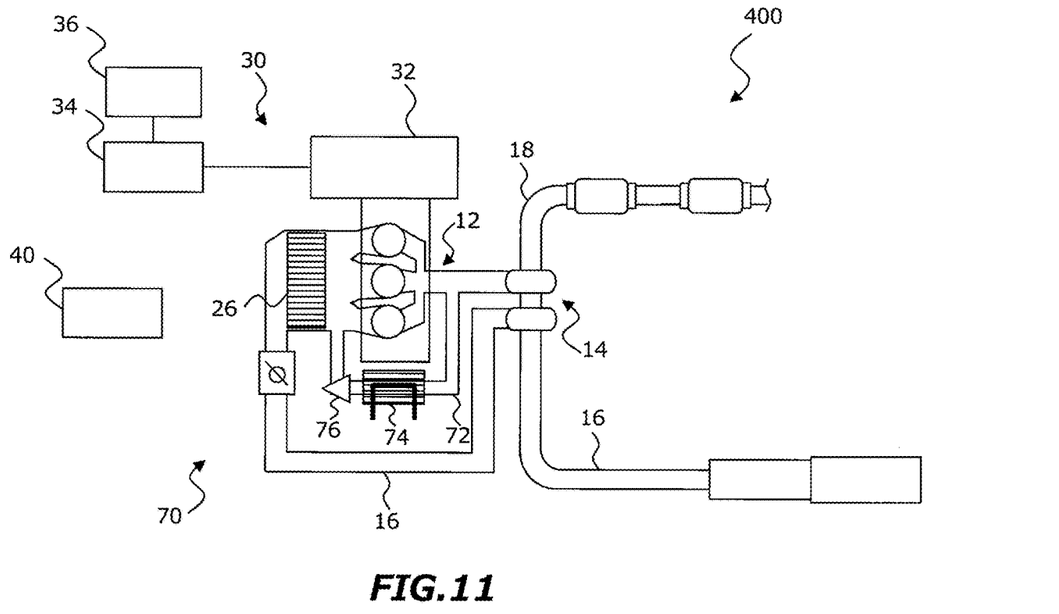
FIG. 11 is a diagram for showing a fourth configuration example of the control system according to the embodiment.

FIG. 11 is a diagram for showing a fourth configuration example of the control system according to the embodiment. A control system 400 shown in FIG. 11 includes an engine system 70. Unlike the engine system 10 shown in FIG. 1, the engine system 70 includes an EGR pipe 72. The EGR pipe 72 recirculates the exhaust gas flowing upstream of the turbine to downstream of the compressor. A water-cooled type EGR cooler 74 is provided in a middle of the EGR pipe 72. An electronically controlled EGR valve 76 is provided downstream of the EGR cooler 74.

In the EGR pipe 20, the EGR cooler 22 and the EGR valve 24 shown in FIG. 1 constitute a low-pressure type EGR device. On the other hand, FIG. On the other hand, the EGR pipe 72, the EGR cooler 74 and the EGR valve 76 shown in FIG. 11 constitute a high-pressure type EGR device. According to the high-pressure type EGR device, similarly to the low-pressure type EGR device, it is possible to cool the exhaust gas to generate a large amount of the condensate water.

Figure 12:
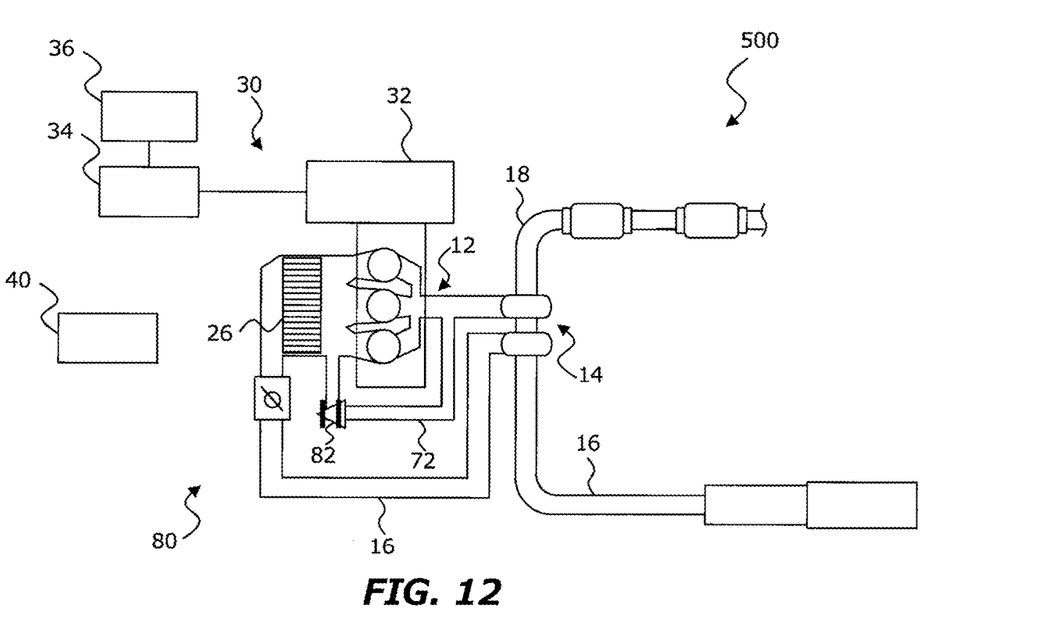
FIG. 12 is a diagram for showing a fifth configuration example of the control system according to the embodiment.

FIG. 12 is a diagram for showing a fifth configuration example of the control system according to the embodiment. The control system 500 shown in FIG. 12 includes an engine system 80. Unlike the engine system 10 shown in FIG. 1, the engine system 80 includes the EGR pipe 72. The EGR pipe 72 is the same one as described FIG. 11. The EGR pipe 72 is provided with a water-cooled type EGR valve 82. According to the EGR valve 82, similarly to the EGR cooler 74, it is possible to cool the exhaust gas to generate a large amount of the condensate water.

Any one of the control systems described in FIG. 9 to FIG. 12 is the hybrid system of a split-power type. However, the control system to which the present disclosure is applied may be a parallel type hybrid system or a series-type hybrid system. In the series-type hybrid system, the power from the engine is used only for generating the electric power by the generator. Therefore, in the case of the series-type hybrid system, the above "engine required torque" may be read as a torque required for generating the electric power by the generator.

What is claimed is:

1. A control system for internal combustion engine, comprising:
   an internal combustion engine which is mounted on a vehicle;
   a generator which is configured to generate electric power by using power from the internal combustion engine;
   an EGR pipe which connects an exhaust pipe and an intake pipe of the internal combustion engine;
   a metallic engine part which is provided on an EGR gas channel through which an EGR gas flows to the internal combustion engine via the EGR pipe, and also includes a surface layer having a corrosion-resistance on its surface to which the EGR gas contacts; and
   a controller which is configured to control an operation of the internal combustion engine and the generator,
   wherein the controller is further configured to:
   determine whether or not a repeating period which was set in accordance with the engine part has elapsed;
   when it is determined that the repeating period has elapsed, determine whether or not there has been an operation request to the internal combustion engine intended to drive the vehicle or generate the electric power with the generator;
   when it is determined that there has been no operation request, execute corrosion control in which the internal combustion engine is operated over a first period in a predetermined operating region in which condensate water occurs and then the operation of the internal combustion engine is stopped over a second period; and
   during the execution of the corrosion control, control the operation of the generator such that the generator generates the electric power by using the power from the internal combustion engine.

2. The control system according to claim 1,
   wherein the controller is further configured to:
   during the execution of the corrosion control, repeatedly determine whether or not there has been the operation request; and
   when it is determined that there has been the operation request during the execution of the corrosion control, stop the execution of the corrosion control.

3. The control system according to claim 1, further comprising a battery which is configured to charge the electric power generated by the generator.

* * * * *